US006647257B2

(12) United States Patent
Owensby (10) Patent No.: US 6,647,257 B2
(45) Date of Patent: *Nov. 11, 2003

(54) SYSTEM AND METHOD FOR PROVIDING TARGETED MESSAGES BASED ON WIRELESS MOBILE LOCATION

(75) Inventor: Craig A. Owensby, Washington, DC (US)

(73) Assignee: Leap Wireless International, Inc., San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,387

(22) Filed: Dec. 10, 1998

(65) Prior Publication Data

US 2002/0077130 A1 Jun. 20, 2002

Related U.S. Application Data

(60) Provisional application No. 60/072,090, filed on Jan. 21, 1998.

(51) Int. Cl.[7] .................................................. H04Q 7/20
(52) U.S. Cl. ................................ 455/414.1; 455/456.1; 455/456.4
(58) Field of Search ................................ 455/403, 405, 455/408, 414, 410, 422, 433, 435, 440, 456, 457, 517, 550, 563, 38.1; 705/10; 340/825.72, 825.44

(56) References Cited

U.S. PATENT DOCUMENTS

| 4,850,007 | A |   | 7/1989  | Marino et al. ............. 379/88.2 |
| 5,283,731 | A |   | 2/1994  | Lalonde et al. ................ 705/1 |
| 5,448,625 | A |   | 9/1995  | Lederman ................. 379/88.25 |
| 5,515,098 | A |   | 5/1996  | Carles .......................... 725/35 |
| 5,539,395 | A | * | 7/1996  | Buss et al. .............. 455/38.1 X |
| 5,546,445 | A | * | 8/1996  | Dennison et al. ........... 455/408 |
| 5,572,653 | A | * | 11/1996 | DeTemple et al. .. 340/825.72 X |
| 5,579,535 | A | * | 11/1996 | Orlen et al. ................. 455/421 |
| 5,752,185 | A | * | 5/1998  | Ahuja ......................... 455/414 |
| 5,848,396 | A | * | 12/1998 | Gerace ......................... 705/10 |
| 5,852,775 | A |   | 12/1998 | Hidary ....................... 455/404 |

(List continued on next page.)

FOREIGN PATENT DOCUMENTS

| EP | 0797368 A2 | 9/1997 |
| EP | 1066867 A2 | 1/2001 |
| EP | 1066868 A2 | 1/2001 |
| EP | 1086732 A1 | 3/2001 |
| EP | 1087323 A1 | 3/2001 |

*Primary Examiner*—Nay Maung
*Assistant Examiner*—Philip J. Sobutka
(74) *Attorney, Agent, or Firm*—Reed Smith LLP; Louis M. Heidelberger; Thomas J. McWilliams (57) ABSTRACT

A system and method is provided for inserting messages, and in particular, commercial information or advertisements, into a wireless mobile communication. The messages are targeted to the subscriber of the basis of: the location of the terminal at the time of the wireless mobile communication; demographic and personal preference data pertaining to the subscriber; responses made to the messages previously provided to the subscriber; or the historical movement patterns of the subscriber. In yet another alternative embodiment, the subscriber is queried at the conclusion to select one of several options. Based on the subscriber's response, the system may provide additional information relating to the targeted message; insert another message; forward a voce mail, e-mail, of facsimile copy of the targeted message to the subscriber; or establish a direct link with a representative of the sponsor of the message, such as a telemarketer.

36 Claims, 4 Drawing Sheets

U.S. PATENT DOCUMENTS

| | | |
|---|---|---|
| 5,937,037 A | 8/1999 | Kamel et al. ............. 379/88.19 |
| 5,970,404 A * | 10/1999 | Foti ........................... 455/410 |
| 5,991,735 A | 11/1999 | Gerace |
| 6,009,150 A | 12/1999 | Kamel ..................... 379/88.22 |
| 6,050,898 A | 4/2000 | Vange et al. |
| 6,055,510 A | 4/2000 | Henrick et al. |
| 6,091,956 A * | 7/2000 | Hollenberg ................. 455/456 |
| 6,113,494 A | 9/2000 | Lennert |
| 6,134,532 A | 10/2000 | Lazarus et al. |
| 6,157,841 A | 12/2000 | Bolduc et al. |
| 6,181,927 B1 | 1/2001 | Welling, Jr. et al. |
| 6,208,866 B1 | 3/2001 | Rouhollahzadeh et al. |
| 6,216,129 B1 | 4/2001 | Eldering |
| 6,223,291 B1 | 4/2001 | Puhl et al. |
| 2001/0005839 A1 | 6/2001 | Maenpaa et al. |
| 2001/0011248 A1 | 8/2001 | Himmel et al. |
| 2001/0013037 A1 | 8/2001 | Matsumoto |
| 2001/0014911 A1 | 8/2001 | Doi et al. |

* cited by examiner

SYSTEM AND METHOD FOR PROVIDING TARGETED MESSAGES BASED ON WIRELESS MOBILE LOCATION

CROSS REFERENCE TO RELATED APPLICATIONS

This application claims the benefit of U.S. Provisional Application Serial No. 60/072,090 filed Jan. 21, 1998.

FIELD OF THE INVENTION

The invention relates generally to a system and method for providing targeted messages to a subscriber of a wireless mobile communications service. More particularly, the invention relates to a system and method for inserting, before and during wireless mobile communications, commercial information or advertisements that are targeted to the subscriber of the wireless mobile communications service. In a preferred embodiment, the messages are chosen from a database of pre-selected commercial information or advertisements and are targeted to the subscriber of the wireless mobile communications service on the basis of Wireless Mobile Location Data included with the call signal. In an alternative embodiment, the commercial information or advertisements are further targeted to the subscriber on the basis of predetermined Subscriber Profile Data pertaining to the subscriber. In another alternative embodiment, the commercial information or advertisements are further targeted to the subscriber on the basis of Historical Response Data relating to the responses made to the targeted messages previously provided to the subscriber. In yet another alternative embodiment, the commercial information or advertisements are further targeted to the subscriber on the basis of Historical Response Data relating to the historical movement patterns of the subscriber.

BACKGROUND OF THE INVENTION

Cellular/Personal Communications Service (C/PCS) and Global Mobile Personal Communications Service (GMPCS) provide audio, video and/or electronic data communications, including wireless mobile telephony service, wireless mobile data transmission service and wireless mobile global computer network (e.g., Internet®) service. Presently, the most common form of C/PCS is hand-held mobile radiotelephone service and the most common form of GMPCS is hand-held mobile satellite telephone service. To obtain these services, customers, referred to herein as "subscribers," register with a particular service provider, referred to herein as an "operator." Upon registration, the operator's network is configured to acquire and route communications initiated or received by the subscriber's personal wireless mobile phone or wireless mobile computer. The subscriber's wireless mobile phone or wireless mobile computer is sometimes referred to in the art as a "mobile station," and are collectively referred to herein as a "wireless mobile terminal." The subscriber can then initiate and receive communications from any mobile location within the operator's wireless network service area.

Typically, wireless mobile terminals are assigned a unique International Mobile Station Identifier (IMSI) or other similar identifying code or number, referred to herein as a "Subscriber Identification Code." The Subscriber Identification Code is pre-programmed into the wireless mobile terminal to identify the subscriber and the subscriber account. Although there is no guarantee that a wireless mobile terminal will always be used by the subscriber of the account assigned the Subscriber Identification Code, typically the user will be the subscriber. Alternatively, the Subscriber Identification Code may be contained on a Subscriber Identity Module (SIM), also referred to in the art as a "Smart Card," which is inserted into the wireless mobile terminal prior to use. The SIM or Smart Card indicates that the user of the wireless mobile terminal is the subscriber of the account assigned the Subscriber Identification Code contained on the SIM or Smart Card, or that the user has been authorized by the subscriber to use the wireless mobile terminal.

Currently, C/PCS networks are significantly more expensive than traditional wire, referred to herein as "landline," communication services. As demand for C/PCS continues to grow, service charges will almost certainly decrease due to an increase in the number of subscribers and an increase in the service capacity of the network. Nevertheless, the service charges associated with communications initiated or received by C/PCS subscribers will likely remain unaffordable for many individuals. As competition further reduces the cost of such services, price wars and an increasing level of bad debt (caused by widespread use of the C/PCS network by lower income subscribers) will progressively erode the operator's profit margin. In view of the additional global service capacity that will be introduced over the next several years, it will be necessary in order for operators to remain profitable that market penetration and service utilization increase significantly. As a result of increased market penetration, a need will exist for a means of reducing subscriber service charges while maintaining operator profit margins.

The emergence of new GMPCS networks creates similar problems for the operators of such services. Due to the initial high cost of introducing and maintaining a GMPCS (including establishing a satellite system that provides global coverage), it will be necessary that GMPCS operators acquire a large number of subscribers over a relatively short period of time. Nevertheless, it is predicted that service charges for GMPCS subscribers will be even higher than service charges for C/PCS subscribers in order for operators to amortize the large up-front capital investments associated with such satellite systems. Consequently, GMPCS operators will intentionally target "high-end" subscribers to minimize the occurrence of bad debt and to maintain acceptable profit margins. The number of subscribers that can afford such high-end services, however, is expected to be limited. Thus, strategies to increase affordability while maintaining operator profit margins will likely be required. Further, the emerging wireless mobile data services and wireless mobile global computer network services are expected to operate in a manner similar to wireless mobile telephony services, thereby creating lower overall mobile service price expectations among subscribers. As such, GMPCS operators will likely be required in the future to provide wireless mobile access to global computer networks. The service charges associated with these additional services will require GMPCS operators to offer even further cost saving incentives to subscribers.

It is thus apparent that a need exists for operators of wireless mobile communications services, and in particular for C/PCS and GMPCS operators, to acquire a large enough number of subscribers to generate sufficient operating revenue and sufficient profit margins to remain profitable. Operators can most easily accomplish this by reducing subscriber service charges while maintaining profit margins. It has been suggested that an effective means for operators to achieve this goal is to offer a pricing program in which sponsors subsidize the wireless mobile communications of subscribers to the service with commercial information or advertisements. The Applicant of the present invention has determined that operators can take advantage of the unique attributes of wireless mobile communications by providing messages that are targeted to the subscriber on the basis of the real-time, physical location of the wireless mobile terminal at the time of the wireless mobile communication, referred to herein as the "wireless mobile location" of the terminal. The Applicant of the present invention has also determined that by utilizing the unique Subscriber Identification Code assigned to each wireless mobile terminal, operators can provide messages that are further targeted to the subscriber on the basis of predetermined data pertaining to the subscriber, referred to herein as "Subscriber Profile Data." The Applicant of the present invention has also determined that operators can provide messages that are further targeted to the subscriber on the basis of the responses made to the targeted messages previously provided to the subscriber, referred to herein as "Historical Response Data." In addition, the Applicant of the present invention has determined that by utilizing the Historical Response Data, operators can provide messages that are further targeted to the subscriber on the basis of the historical movement patterns of the subscriber.

While it is known for operators to provide messages that are targeted to the subscribers of conventional landline communications services, the known systems and methods have inherent limitations. Most importantly, a landline communication is initiated or received by a terminal (e.g., handset or computer) transmitting or receiving from a fixed location. As previously mentioned, the term "wireless mobile location" as used herein is intended to mean the real-time, physical location of the wireless mobile terminal at the time that a wireless mobile communication is initiated or received. Accordingly, messages cannot be targeted to the subscriber of a landline communications service on the basis of the physical location of the subscriber when the call is initiated from or received at a location other than the fixed location of the terminal. In addition, today's increasingly mobile society makes it far less likely that the user of a fixed location terminal is the subscriber of the landline communications service. Accordingly, it is significantly less certain that a message targeted to a subscriber of a landline communications service will actually be received by the subscriber of the service rather than by a caller who is merely using the fixed location terminal. As a result, it is less likely that a potential sponsor of the message, particularly if the message is an advertisement, will be willing to subsidize the landline communication. Even if the sponsor is willing to subsidize the landline communication, the sponsor is likely to attribute substantially less value to the effectiveness of the "non-targeted" message.

It is also known to utilize the Wireless Mobile Location Data included with the call signal of a wireless mobile communication to inform the subscriber of his or her real-time, physical location at the time that a call is initiated or received by the wireless mobile terminal. In other words, the subscriber to the service is provided with a message, and more precisely with data, about the geographical location of the wireless mobile terminal. The subscriber is not, as in the present invention, provided with a message, for example an advertisement, about business or service opportunities that is targeted to the subscriber based on the geographical location of the wireless mobile terminal. Thus far, none of the known systems and methods for informing a subscriber of his or her geographical location has been utilized to provide commercial information or advertisements to the subscriber of a wireless mobile communications service that is targeted to the subscriber on the basis of the Wireless Mobile Location Data included with the call signal. Further, none of the known systems and methods for informing a subscriber of his or her geographical location has been utilized to subsidize the wireless mobile communications of the subscriber.

SUMMARY OF THE INVENTION

The invention is a system and method for providing targeted messages to a subscriber of a wireless mobile communications service. More particularly, the invention is a system and method for inserting commercial information or advertisements before and during C/PCS and GMPCS communications that are targeted to the subscriber of the service. In a preferred embodiment, the messages are chosen from a database of pre-selected commercial information or advertisements and are targeted to the subscriber of the wireless mobile communications service on the basis of Wireless Mobile Location Data included with the call signal. In an alternative embodiment, the messages are further targeted to the subscriber of the wireless mobile communications service on the basis of predetermined Subscriber Profile Data pertaining to the subscriber and stored in an electronic database. In another alternative embodiment, the messages are further targeted to the subscriber of the wireless mobile communications service on the basis of Historical Response Data relating to the responses made to the targeted messages previously provided to the subscriber and stored in an electronic database. In yet another alternative embodiment, the messages are further targeted to the subscriber of the wireless mobile communications service on the basis of Historical Response Data relating to the historical movement patterns of the subscriber and stored in an electronic database.

The targeted messages, which may include audio, video and/or electronic data, but which are preferably audio commercial information or advertisements, are pre-selected and stored in a conventional electronic data input, storage and retrieval device. The messages to be targeted to the subscriber are chosen from the pre-selected messages, in a manner to be described hereinafter, at the time that a wireless mobile communication is initiated or received by a wireless mobile terminal. As is well known to those skilled in the art, the wireless mobile communication comprises a call signal and Wireless Mobile Location Data that is included with the call signal. The Wireless Mobile Location Data identifies the real-time, physical location of the wireless mobile terminal at the time that the wireless mobile communication is initiated or received, referred to herein as the "wireless mobile location" of the terminal. Accordingly, the messages can be targeted to the subscriber of the wireless mobile communications service solely on the basis of the wireless mobile location of the terminal, and consequently, the geographical location of the subscriber.

Preferably, the wireless mobile communication further comprises a unique Subscriber Identification Code that is likewise included with the call signal. The Subscriber Identification Code is assigned to the subscriber's wireless mobile terminal, or to a specific subscriber of a wireless mobile communications service using a Subscriber Identity Module (SIM) or Smart Card which can be used in any wireless mobile terminal having the capability to accept a SIM or Smart Card, thereby allowing any such terminal to be identified with the subscriber associated with the SIM or Smart Card. The Subscriber Identification Code is used to identify predetermined Subscriber Profile Data pertaining to the subscriber and stored in an electronic database.

Preferably, the Subscriber Profile Data includes demographic and personal preference data pertaining to the subscriber that is collected from the subscriber at the time the subscriber registers with the operator of the wireless mobile communications service, stored in a conventional electronic data input, storage and retrieval device and updated at regular intervals.

For example, the demographic data typically includes standard demographic information such as age, gender, race and national origin, but may include any demographic information selected by the sponsors of the messages to be targeted to the subscriber. The personal preference data typically includes general information relating to the individual preferences of the subscriber such as preferred types of food and kinds of entertainment, as well as any hobbies or interests the subscriber may have. However, the personal preference data may include any personal preference information selected by the sponsors of the messages to be targeted to the subscriber. Whenever applicable, the predetermined Subscriber Profile Data may also include psychographic data obtained and selected in a similar manner. In a preferred embodiment of the invention, the messages are further targeted to the subscriber identified by the Subscriber Identification Code on the basis of the Subscriber Profile Data in addition to the Wireless Mobile Location Data.

Preferably, the wireless mobile communication further comprises a Call Identification Code and Date and Time Data that are likewise included with the call signal. The Call Identification Code is assigned when a wireless mobile communication is initiated or received by the wireless mobile terminal to identify the wireless mobile communication relative to other wireless mobile communications occurring at or about the same time. The Date and Time Data determines and records the date and time of the wireless mobile communication. Together with the Wireless Mobile Location Data, the Call Identification Code and the Date and Time Data permit Historical Response Data relating to the wireless mobile communication to be compiled and stored in a conventional electronic data input, storage and retrieval device. The Historical Response Data records information about the responses made to the targeted messages previously provided to the subscriber as well as the wireless mobile location of the terminal at the time of the wireless mobile communication. Accordingly, the historical movement patterns of the subscriber can be determined from the Historical Response Data.

The Historical Response Data is acquired and updated continuously as the wireless communications service is utilized by the subscriber to determine the most recent responses to the targeted messages previously provided to the subscriber and the historical movement patterns of the subscriber. The Historical Response Data may, for example, be used to anticipate the type of message that the subscriber is likely to respond positively to in the future based on the subscriber's previous responses to similar messages. The Historical Response Data may also be used to predict an area that the subscriber is likely to visit at a particular time, for example close to the lunch or dinner hour. In the latter example, the targeted message may be an advertisement for a restaurant in the area that serves a type of food preferred by the subscriber, as indicated by the Subscriber Profile Data. By assimilating the Wireless Mobile Location Data with the Subscriber Profile Data and/or the Historical Response Data, the invention permits messages, and in particular commercial information and advertisements, to be targeted to as broad or narrow a range of subscribers as desired by the sponsor of the message.

Further, the system and method of the invention permit the subscriber to interactively respond to a message provided to the subscriber, or to an inquiry for additional information from the operator of the service or from the sponsor of the message. Preferably, the operator queries the subscriber at the conclusion of a message, at the conclusion of a group of messages or at the conclusion of the wireless mobile communication, to select one of several options and then monitors the subscriber's response to the query. For example, the subscriber could request the operator to insert another message into the wireless mobile communication, to forward an audio, video or electronic data copy of the previously provided message to an electronic message input, storage and retrieval database (e.g., voice mail, e-mail, facsimile, etc.), or to establish a direct telecommunications or other data link with a representative of the sponsor of the message, such as a telemarketer. The subscriber may respond to the operator's query and the operator may fulfill the subscriber's request immediately following a particular message, immediately following a group of messages or following the conclusion of the wireless mobile communication (e.g., in the form of a "call-back" from a telemarketing representative).

A preferred embodiment of a system according to the invention is a wireless mobile telephony system for providing messages to a subscriber of a wireless mobile communications service that are targeted to the subscriber on the basis of wireless mobile location. The preferred embodiment of the system includes a wireless mobile terminal for initiating and receiving a wireless mobile communication comprising a call signal and Wireless Mobile Location Data included with the call signal. The system further includes a Base Transceiver Station in radio frequency communication with the wireless mobile terminal and a Call Management System in communication with the Base Transceiver Station. Preferably, the Call Management System is in electrical communication with the Base Transceiver Station. However, the Call Management System may be in radio frequency communication with the Base Transceiver Station, as will be described. The wireless mobile terminal includes a first transceiver for transmitting and receiving the call signal to and from the Base Transceiver Station. Likewise, the Base Transceiver Station includes a second transceiver for transmitting and receiving the call signal to and from the wireless mobile terminal and to and from the Call Management System. The Call Management System includes an Ad Chooser Server for choosing the messages to be targeted to the subscriber, as will be described.

The preferred embodiment of the system further includes a first electronic data input, storage and retrieval device in electrical communication with the Ad Chooser Server of the Call Management System. The first electronic data input, storage and retrieval device includes means for inputting, storing and selectively retrieving pre-selected Ad Content Data, and for inputting, storing and selectively retrieving pre-selected Ad Target Data. The Ad Content Data consists of a plurality of pre-selected audio, video and/or electronic data messages, but preferably consists of pre-selected audio commercial information or advertisements. The Ad Target Data consists of predetermined criteria for choosing the messages to be provided to the subscriber. In the preferred embodiment, the Ad Chooser Server chooses the messages to be provided to the subscriber on the basis of the Wireless Mobile Location Data included with the call signal of the wireless mobile communication.

In an alternative embodiment of the system of the invention, the wireless mobile terminal is assigned a unique Subscriber Identification Code for identifying the subscriber, as previously described. In addition, the Call Management System further includes a second electronic data input, storage and retrieval device in electrical communication with the Ad Chooser Server. The second electronic data input, storage and retrieval device inputs, stores and selectively retrieves the predetermined Subscriber Profile Data pertaining to the subscriber corresponding to the unique Subscriber Identification Code. The Ad Chooser Server then chooses the messages to be provided to the subscriber on the basis of the predetermined Subscriber Profile Data pertaining to the subscriber in addition to the Wireless Mobile Location Data.

In another alternative embodiment of the system of the invention, the wireless mobile terminal is assigned a unique Subscriber Identification Code for identifying the subscriber, as previously described. In addition, the Call Management System further includes a third electronic data input, storage and retrieval device in electrical communication with the Ad Chooser Server. The third electronic data input, storage and retrieval device inputs, stores and selectively retrieves Historical Response Data relating to the responses made to the messages previously provided to the subscriber corresponding to the unique Subscriber Identification Code. The Ad Chooser Server then chooses the next message to be provided to the subscriber on the basis of the Historical Response Data in addition to the Wireless Mobile Location Data.

In yet another alternative embodiment of the system of the invention, the wireless mobile terminal is assigned a unique Subscriber Identification Code for identifying the subscriber, as previously described. In addition, the Call Management System further includes a third electronic data input, storage and retrieval device in electrical communication with the Ad Chooser Server. The third electronic data input, storage and retrieval device inputs, stores and selectively retrieves Historical Response Data relating to the historical movement patterns of the subscriber corresponding to the unique Subscriber Identification Code. The Ad Chooser Server then chooses the messages to be provided to the subscriber on the basis of the Historical Response Data in addition to the Wireless Mobile Location Data.

The wireless mobile telephony system of the invention may also include a Base Station Controller in electrical communication with the Base Transceiver Station and in communication with the Call Management System. Preferably, the Base Station Controller is in electrical communication with the Call Management System. However, the Base Station Controller may be in radio frequency communication with the Call Management System, as will be described. The Base Station Controller controls two or more Base Transceiver Stations as the subscriber moves from an area serviced by one Base Transceiver Station to an area serviced by another Base Transceiver Station. Regardless, the Ad Chooser Server of the Call Management System operates in the same manner to choose the messages to be targeted to the subscriber on the basis of the Wireless Mobile Location Data, or on the basis of the Subscriber Profile Data in addition to the Wireless Mobile Location Data, or on the basis of the Historical Response Data in addition to the Wireless Mobile Location Data.

The wireless mobile telephony system of the invention may also include a Mobile Switching Center in electrical communication with the Base Transceiver Station, either directly or through the Base Station Controller, or in communication with the Call Management System and a Local Landline Network. Preferably, the Mobile Switching Center is in electrical communication with the Call Management System and the Local Landline Network. However, the Mobile Switching Center may be in radio frequency communication with the Call Management System, as will be described. The Mobile Switching Center is utilized to acquire and route the wireless mobile communication comprising the call signal transmitted and received by the first transceiver and the second transceiver. Regardless, the Ad Chooser Server of the Call Management System operates in the same manner to choose the messages to be targeted to the subscriber on the basis of the Wireless Mobile Location Data, or on the basis of the Subscriber Profile Data in addition to the Wireless Mobile Location Data, or on the basis of the Historical Response Data in addition to the Wireless Mobile Location Data.

The Call Management System of the wireless mobile telephony system of the invention may also include a Voice Response Unit, or other known communication holding and audio message insertion technology, in electrical communication with the Ad Chooser Server. Preferably, the Voice Response Unit includes a plurality of ports, or any other known technology, that receive, hold (i.e., "park") and direct or re-direct a wireless mobile communication to a desired destination. Preferably, the Voice Response Unit further includes a plurality of voice cards, or any other known technology (e.g., non-analog digital insertion), that insert audio messages into the parked wireless mobile communication. Thus, the Voice Response Unit receives, parks, inserts an audio message that is targeted to the subscriber of the wireless mobile communications service, and forwards the wireless mobile communication to the desired destination. In that regard, the Voice Response Unit acts a "smart switch" with communication parking and audio message insertion capability. Regardless, the Ad Chooser Server of the Call Management System operates in the same manner to choose the messages to be targeted to the subscriber on the basis of the Wireless Mobile Location Data, or on the basis of the Subscriber Profile Data in addition to the Wireless Mobile Location Data, or on the basis of the Historical Response Data in addition to the Wireless Mobile Location Data.

A preferred embodiment of a method according to the invention for providing a message to a subscriber of a wireless mobile communications service that is targeted to the subscriber on the basis of wireless mobile location includes at least the following steps. A first electronic database consisting of a plurality of pre-selected messages and predetermined criteria for choosing the messages to be provided to the subscriber is compiled. A wireless mobile terminal is then provided for initiating and receiving a wireless mobile communication comprising a call signal and Wireless Mobile Location Data included with the call signal. The call signal (if required) and the Wireless Mobile Location Data are then extracted from the wireless mobile communication and provided to a Call Management System including an Ad Chooser Server for choosing the messages to be provided to the subscriber. The predetermined criteria of the first database is then utilized to choose a message from the plurality of pre-selected messages of the first database that is targeted to the subscriber on the basis of the Wireless Mobile Location Data. Finally, the message that is targeted to the subscriber on the basis of the Wireless Mobile Location Data is provided to the subscriber.

An alternative embodiment of the method of the invention includes at least the following additional steps. A unique Subscriber Identification Code for identifying the subscriber is assigned to the wireless mobile terminal and included with the call signal and the Wireless Mobile Location Data. In addition, a second electronic database consisting of predetermined Subscriber Profile Data pertaining to the subscriber corresponding to the Subscriber Identification Code is compiled. The predetermined criteria of the first database and the unique Subscriber Identification Code are then utilized to choose a message from the plurality of pre-selected messages of the first database that is targeted to the subscriber on the basis of the predetermined Subscriber Profile Data of the second database in addition to the Wireless Mobile Location Data. Finally, the message that is further targeted to the subscriber on the basis of the predetermined Subscriber Profile Data is provided to the subscriber.

Another alternative embodiment of the method of the invention includes at least the following additional steps. A unique Subscriber Identification Code for identifying the subscriber is assigned to the wireless mobile terminal and included with the call signal and the Wireless Mobile Location Data. In addition, a third electronic database of Historical Response Data relating to the responses made to the messages previously provided to the subscriber corresponding to the unique Subscriber Identification Code is compiled. The predetermined criteria of the first database and the unique Subscriber Identification Code are then utilized to choose a message from the plurality of pre-selected messages of the first database that is targeted to the subscriber on the basis of the historical responses of the third database in addition to the Wireless Mobile Location Data. Finally, the message that is further targeted to the subscriber on the basis of the Historical Response Data is provided to the subscriber.

Yet another alternative embodiment of the method of the invention includes at least the following additional steps. A unique Subscriber Identification Code for identifying the subscriber is assigned to the wireless mobile terminal and included with the call signal and the Wireless Mobile Location Data. In addition, a third electronic database of Historical Response Data relating to the responses made to the messages previously provided to the subscriber corresponding to the unique Subscriber Identification Code is compiled. The predetermined criteria of the first database and the unique Subscriber Identification Code are then utilized to choose a message from the plurality of pre-selected messages of the first database that is targeted to the subscriber on the basis of the historical movement patterns of the third database in addition to the tireless Mobile Location Data. Finally, the message that is further targeted to the subscriber on the basis of the Historical Response Data is provided to the subscriber.

Finally, any of the preferred embodiments of the method of the invention described herein may include at least the following additional steps. Utilizing the call signal of the wireless mobile communication, the Call Management System queries the subscriber at the conclusion of a message, at the conclusion of a group of messages or at the conclusion of the wireless mobile communication, to select one of several options and monitors the subscriber's response to the query. Preferably, the subscriber activates a specified key or button on the wireless mobile terminal to transmit the response to the Ad Chooser Server of the Call Management System for processing. However, the subscriber's response may also take the form of a voice response (i.e., an audio signal) that is recognized by the system. Based on the subscriber's response, the Call Management System may provide additional information relating to the previously provided message, insert another message into the wireless mobile communication, forward an audio, video or electronic data copy of the previously provided message to an electronic message input, storage and retrieval database (e.g., voice mail, e-mail, facsimile, etc.), or establish a direct telecommunications or other data link with a representative of the sponsor of the message, such as a telemarketer. The subscriber may respond to the operator's query and the operator may fulfill the subscriber's request immediately following a particular message, immediately following a group of messages or following the conclusion of the wireless mobile communication (e.g., in the form of a "call-back-" from a telemarketer).

OBJECTS OF THE INVENTION

Accordingly, a principal object of the invention is to provide a system and method for targeting audio, video or electronic data messages, and in particular audio commercial information or advertisements, to a subscriber of a wireless mobile communications service.

A further, and more particular object of the invention is to provide a system and method for inserting commercial information or advertisements into a wireless mobile communication initiated or received by a subscriber of a wireless mobile communications service that are targeted to the subscriber on the basis of the Wireless Mobile Location Data included with the call signal.

A further, and still more particular object of the invention is to provide a system and method for subsidizing the cost of a wireless mobile communications service by inserting commercial information or advertisements before and during a wireless mobile communication that are targeted to the subscriber of the service on the basis of the wireless mobile location of the subscriber's wireless mobile terminal.

A further, and still more particular object of the invention is to provide a system and method for subsidizing the cost of C/PCS and GMPCS by inserting commercial information or advertisements before and during a wireless mobile communication that are targeted to the subscriber of the service on the basis of the Wireless Mobile Location Data included with the call signal.

Another object of the invention is to provide a system and method for further targeting messages to a subscriber of a wireless mobile communications service on the basis of predetermined Subscriber Profile Data pertaining to the subscriber and stored in an electronic database.

Another object of the invention is to provide a system and method for further targeting messages to a subscriber of a wireless mobile communications service on the basis of Historical Response Data relating to the responses made to the targeted messages previously provided to the subscriber and stored in an electronic database.

Another object of the invention is to provide a system and method for further targeting messages to a subscriber of a wireless mobile communications service on the basis of Historical Response Data relating to the historical movement patterns of the subscriber and stored in an electronic database.

Yet another object of the invention is to permit subscribers of a wireless mobile communications service to interactively request and receive additional information relating to messages provided to the subscriber and to be connected to a telemarketing representative, or to respond to inquiries from the operator of the service or the sponsor of the message.

BRIEF DESCRIPTION OF THE DRAWINGS

The foregoing objects of the invention and others will become more readily apparent by referring to the following detailed description and the appended drawings in which.

DETAILED DESCRIPTION OF THE PREFERRED EMBODIMENTS

The invention is a system and method for providing targeted messages to a subscriber of a wireless mobile communications service. More particularly, the invention is a system and method for inserting commercial information or advertisements before and during C/PCS and GMPCS communications that are targeted to the subscriber of the wireless mobile communications service on the basis of wireless mobile location. Further, the invention is a system and method for providing additional information relating to the targeted message or for providing a direct connection to a representative of the operator of the service or the sponsor of the message, such as a telemarketer, in response to a request from the subscriber elicited by a query from the operator or the sponsor. The system, indicated generally at 10 in FIGS. 1–X, comprises at least a wireless mobile terminal 12, a Base Transceiver Station 14 and a Call Management System 20. The method, indicated generally at 50 in FIG. 4, comprises at least the steps of (a) compiling a first electronic database consisting of a plurality of pre-selected messages and predetermined criteria for choosing a message to be targeted to the subscriber; (b) providing a wireless mobile terminal 12 for initiating and receiving a wireless mobile communication comprising a call signal and Wireless Mobile Location Data included with the call signal; (c) extracting the call signal and the Wireless Mobile Location Data from the wireless mobile communication; (d) providing the Wireless Mobile Location Data to a Call Management System 20; (e) utilizing the predetermined criteria of the first database to choose a message from the plurality of pre-selected messages of the first database that is targeted to the subscriber on the basis of the Wireless Mobile Location Data; and (f) providing the targeted message to the subscriber.

Figure 1:
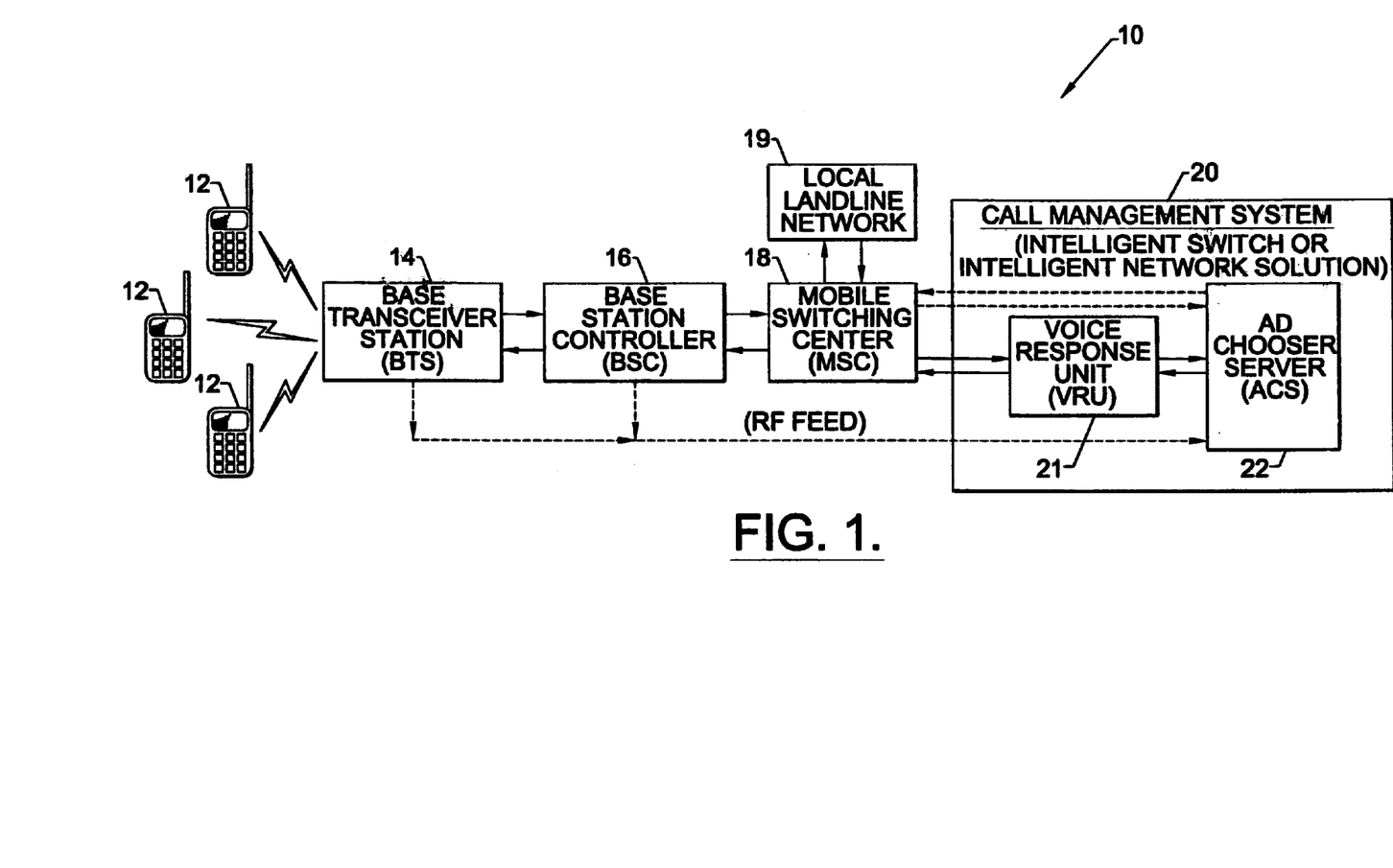
FIG. 1 is a schematic diagram of a preferred embodiment of a system for providing targeted messages to a subscriber of a wireless mobile communications service according to the present invention.
Figure 2:
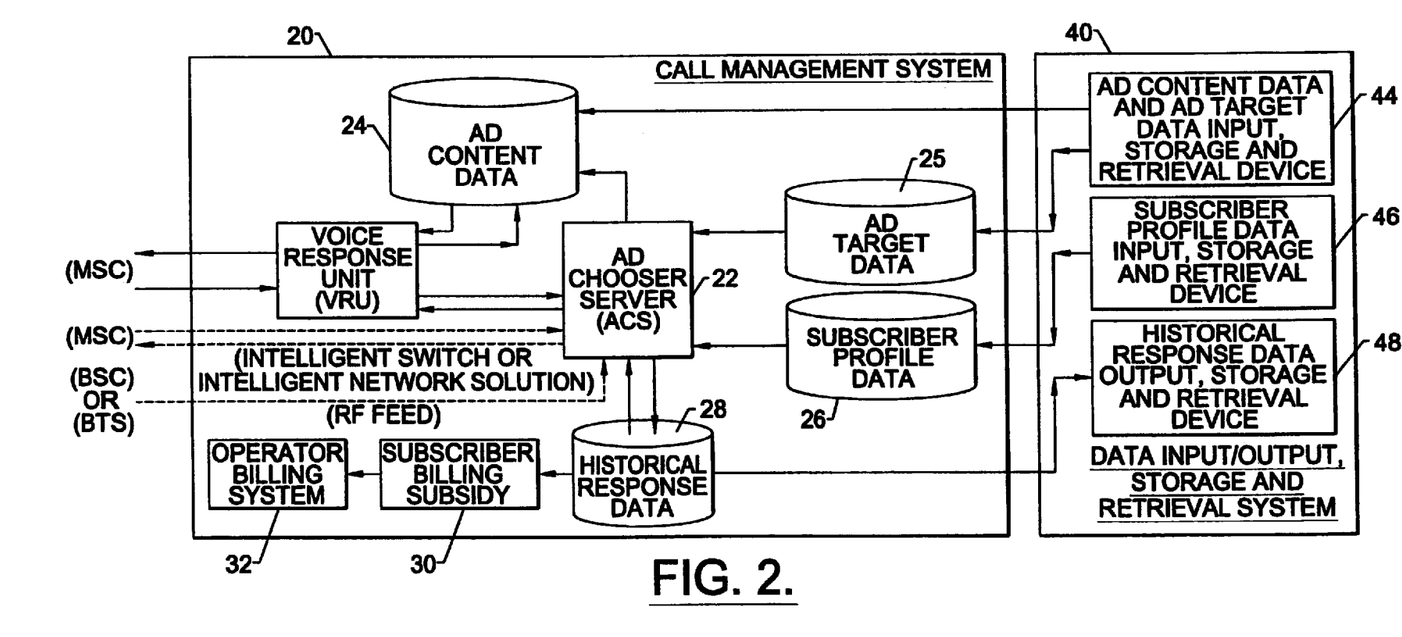
FIG. 2 is a schematic diagram of the Call Management System of FIG. 1.

In the preferred embodiment illustrated in FIGS. 1 and 2, the system 10 comprises at least one wireless mobile terminal 12, at least one Base Transceiver Station 14 in radio frequency communication with the wireless mobile terminal and a Call Management System 20 in communication with the Base Transceiver Station. Preferably, the wireless mobile terminal 12 is a wireless mobile phone or wireless mobile computer, sometimes referred to in the art as a "mobile station." The wireless mobile terminal 12 comprises a first transceiver (not shown) for transmitting and receiving audio, video and/or electronic data in conjunction with conventional wireless communications services, such as wireless mobile telephony service, wireless mobile data transmission service and wireless mobile global computer network (e.g., Internet®) service. Most preferably, the wireless communications service is a wireless mobile telephony service provided by a C/PCS or GMPCS operator that permits a subscriber to the service to initiate and receive a wireless mobile communication from any mobile location within the operator's wireless network service area.

When a wireless mobile communication is initiated or received by the wireless mobile terminal 12, a call signal is generated and transmitted between the origin and the destination of the wireless mobile communication. At the same time, Wireless Mobile Location Data relating to the wireless mobile terminal 12 is generated and included with the call signal. The Wireless Mobile Location Data determines the real-time, physical location of the wireless mobile terminal 12 within the operator's wireless network service area at the time that the wireless mobile communication is initiated or received. As used herein, the term "wireless mobile location" refers to the real-time, physical location of the wireless mobile terminal 12 at the time that the wireless mobile communication is initiated or received by the terminal. Consequently, the Wireless Mobile Location Data identifies the geographical location of the subscriber using the wireless mobile terminal 12. In the case of C/PCS, the Wireless Mobile Location Data determines the wireless mobile location of the subscriber within a predetermined cell, or within a predetermined sector of a given cell, of the operator's network. Accordingly, it is possible to determine the true geographical location of the subscriber to a high degree of precision. It is anticipated that as cellular technology improves, the Wireless Mobile Location Data will be able to determine the wireless mobile location of the wireless mobile terminal 12 within an even smaller subdivision of a given cell, and thus, the true geographical location of the subscriber to a higher degree of precision. In the case of GMPCS, the Wireless Mobile Location Data determines the wireless mobile location of the wireless mobile terminal 12 by geo-positioning via a Global Positioning System (GPS) communications relay satellite. Accordingly, it is possible to determine the true geographical location of the subscriber to an even greater degree of precision.

As previously mentioned, the wireless mobile terminal 12 is in radio frequency communication with at least one Base Transceiver Station 14. The Base Transceiver Station 14 comprises a second transceiver (not shown) for tracking a locator signal transmitted by the first transceiver when the wireless mobile terminal 12 is activated within the operator's wireless network service area. In addition, the second transceiver of the Base Transceiver Station 14 transmits and receives the wireless mobile communication. Depending on the size of the operator's wireless network service area and/or the density of the wireless communications traffic within the service area, a plurality of Base Transceiver Stations 14 are typically required to continuously track the locator signal transmitted by the first transceiver of the wireless mobile terminal 12. Accordingly, the wireless mobile terminal 12 may communicate with more than one Base Transceiver Station 14 as the subscriber travels from one location to another within the operator's service area. As will be described, transfer of the wireless mobile communication from one Base Transceiver Station 14 to another as the subscriber travels between base stations within the operator's service area may be accomplished in a well known manner by a Base Station Controller 16.

In the case of GMPCS, the first transceiver of the wireless mobile terminal 12 may alternatively transmit the call signal directly to a communications relay satellite. In such case, the communications satellite provides a more accurate record of the wireless mobile location of the wireless mobile terminal 12 on the surface of the earth utilizing a related Global Positioning System (GPS), a separate GPS or other means based on the terrestrial coverage area of the transceiver assigned to manage the wireless mobile communication. Accordingly, the Wireless Mobile Location Data could be acquired via geo-positioning and provided to the Call Management System directly by the communications relay satellite. Further discussion of the principles of cellular and satellite wireless communications technology is unnecessary to an enabling disclosure of the present invention, and therefore is not provided herein. However, additional information regarding the state of the art of cellular and satellite wireless communications technology is available from the excellent technical reference entitled: GSM CELLULAR RADIO TELEPHONY written by Joachim Tisal and available from John Wiley & Sons, LTD, West Sussex, England, the disclosure of which is expressly incorporated herein.

As previously mentioned, the Base Transceiver Station 14 is in communication with the Call Management System 20. Preferably, the Base Transceiver Station 14 is in electrical communication with the Call Management System 20. However, the Base Transceiver Station 14 may be in radio frequency communication with the Call Management System 20 if logistics permit the wireless mobile communication to be transmitted directly to the Call Management System without the use of a Mobile Switching Center 18, as will be described. In FIG. 1, the electrical communication between the Base Transceiver Station 14 and the Call Management System 20 is indicated by the solid lines which connect the Base Transceiver Station, the Base Station Controller 16, the Mobile Switching Center 18 and the Call Management System. The direct radio frequency communication between the Base Transceiver Station 14 and the Call Management System 20 is indicated by the dashed lines connecting the Base Transceiver Station and the Call Management System via an optional RF feed. Regardless, the Call Management System 20 comprises an Ad Chooser Server 22 for choosing the messages to be targeted to the subscriber.

In an alternative embodiment, the system 10 of the invention further comprises a Base Station Controller 16. The Base Station Controller 16 governs the operation of one or more Base Transceiver Stations 14 and carries out a number of other operational and telecommunications functions. For wireless mobile communications arriving from the Base Transceiver Station(s) 14, the Base Station Controller 16 directs the various communications to a Mobile Switching Center 18 for acquisition and further routing. For wireless communications arriving from the Mobile Switching Center 18, the Base Station Controller 16 routes each communication to the proper Base Transceiver Station 14. The Base Station Controller 16 also controls the transfer of the wireless mobile communication from one Base Transceiver Station 14 to another, commonly referred to as a "handover," as the wireless mobile terminal 12 crosses the geographical boundary between adjacent cells, commonly referred to as "roaming," within the operator's wireless network service area. In order to achieve a handover when the wireless mobile terminal 12 is roaming, the Base Station Controller 16 provides the Base Transceiver Station 14 in the cell that will be acquiring the wireless mobile communication the necessary information to take control of the communication. Thereafter, the Base Station Controller 16 transfers the wireless mobile communication to the receiving Base Transceiver Station 14. Preferably, the Base Station Controller 16 is in electrical communication with the Call Management System 20 through the Mobile Switching Center 18. However, similar to the Base Transceiver Station 14, the Base Station Controller 16 may be in direct radio frequency communication with the Call Management System 20 via an optional RF feed.

In yet another alternative embodiment, the system 10 of the invention further comprises a Mobile Switching Center 18, also referred to herein as a "Switch." The Mobile Switching Center 18 connects the wireless mobile communications network and the Call Management System 20 to a Local Landline Network 19, such as an Integrated Switched Digital Network (ISDN) or Public Switched Telephone Network (PSTN). In particular, the Mobile Switching Center acquires wireless mobile communications originated or received by the wireless mobile terminal 12 of a subscriber of the service, including the call signal, and routes the communication between the Base Transceiver Station 14 or the Base Station Controller 16, via the Local Landline Network, to the Call Management System 20. In addition, the Switch 18 acts as a network node to provide access to the network databases and to the Authentication Center, which stores, retrieves, monitors and applies subscriber access rights. Preferably, the Call Management System 20 comprises a Voice Response Unit 21, or other known call holding and audio message insertion technology, in addition to the Ad Chooser Server 22. If so, the Mobile Switching Center 18 is in direct electrical communication with the Voice Response Unit 21, which in turn is in direct electrical communication with the Ad Chooser Server 22. Alternatively, the Switch 18 is in radio frequency communication with the Ad Chooser Server 22, in which case the Mobile Switching Center acts in a known manner as an intelligent switch or other known intelligent network solution. Regardless, the Mobile Switching Center 18 identifies and separates the wireless mobile communications that are to be provided with a targeted message from the wireless mobile communications that are not to be provided with a targeted message. The Switch 18 then transmits the wireless mobile communications to be provided with a targeted message to the Voice Response Unit 21 or directly to the Ad Chooser Server 22.

Preferably, the Voice Response Unit 21 comprises a plurality of ports for receiving, holding (also referred to in the art as "parking") and directing or re-directing the wireless mobile communication to the Mobile Switching Center 18, or directly to its origin or destination terminal. Preferably, the Voice Response Unit 21 further comprises a plurality of voice cards, or any other known technology that inserts an audio message into a parked wireless mobile communication, such as a non-analog, digital insertion device or system. Thus, the Voice Response Unit 21 receives, parks, inserts an audio message that is targeted to the subscriber of the wireless mobile communications service, and forwards the wireless mobile communication to its origin or destination terminal. In that regard, the Voice Response Unit 21 acts in a known manner as a "smart switch" with call parking and audio message insertion capability. Alternatively, as previously mentioned the Mobile Switching Center 18 may be in direct radio frequency communication with the Ad Chooser Server 22 via an optional intelligent switch or intelligent network solution. Regardless, the Ad Chooser Server 22 of the Call Management System 20 operates in the same manner to choose the messages to be targeted to the subscriber and inserted into the call signal of the wireless mobile communication.

As illustrated in FIG. 2, the Call Management System 20 is in electrical communication with a Data Input/Output, Storage and Retrieval System 40. The Data Input/Output, Storage and Retrieval System 40 inputs, outputs stores and retrieves data relating to the subscriber, the messages to be targeted to the subscriber and the targeted messages previously provided to the subscriber. The Data Input/Output, Storage and Retrieval System 40 comprises a first electronic data input, storage and retrieval device 44 for manipulating a first database including a plurality of pre-selected messages, referred to herein as Ad Content Data 24, to be targeted to the subscriber of the wireless mobile communications service. The first database further includes predetermined criteria for choosing the messages to be targeted to the subscriber, referred to herein as Ad Target Data 25, from the pre-selected messages of the Ad Content Data 24. Preferably, the Data Input/Output, Storage and Retrieval System 40 further comprises a second electronic data input, storage and retrieval device 46 for manipulating a second database consisting of Subscriber Profile Data 26 pertaining to the subscriber, as will be described. Preferably, the Data Input/Output, Storage and Retrieval System 40 further comprises a third electronic data output, storage and retrieval device 48 for manipulating a third database consisting of historical data relating to the targeted messages provided to the subscriber and the responses made to the targeted messages provided to the subscriber. The historical data of the third database is referred to herein as Historical Response Data 28. Certain of the Historical Response Data 28, referred to herein as Ad Insert Records, is provided to a fourth database to compute the Subscriber Billing Subsidy 30 to be credited to the subscriber account. Thereafter, the Ad Insert Records data is provided to a fifth database, referred to herein as the Operator Billing System 32, to apply the Subscriber Billing Subsidy 30 to the appropriate subscriber account and invoice the subscriber.

In an alternative embodiment of the system 10 of the invention, the wireless mobile terminal 12 is assigned a unique Subscriber Identification Code that is pre-programmed into the wireless mobile terminal. Alternatively, the Subscriber Identification Code may be contained on a Subscriber Identity Module (SIM) or Smart Card that is inserted into the wireless mobile terminal 12 prior to use, as previously described. Regardless, the Subscriber Identification Code identifies the wireless mobile terminal 12, and consequently, the subscriber of the service and the subscriber account corresponding to the wireless mobile terminal. The Subscriber Identification Code is included with the call signal, and as such, is provided to the Ad Chooser Server 22 of the Call Management System 20 where it is used to identify the predetermined Subscriber Profile Data 26 pertaining to the subscriber. Preferably, the Subscriber Profile Data 26 is collected from the subscriber at the time the subscriber registers with the operator of the wireless mobile communications service, is input into the Subscriber Profile Data Input, Storage and Retrieval Device 46 and is updated at regular intervals. The Subscriber Profile Data 26 preferably includes demographic and personal preference data pertaining specifically to the subscriber. For example, the demographic data typically includes standard demographic information such as age, gender, race and national origin, but may include any demographic information selected by the sponsors, typically advertisers, of the messages to be targeted to the subscriber. The personal preference data typically includes general information relating to the individual preferences of the subscriber, such as preferred types of food and kinds of entertainment, as well as any specific hobbies or interests the subscriber may have. However, the personal preference data may include any personal preference information selected by the sponsors, typically advertisers, of the messages to be targeted to the subscriber. Whenever applicable, the predetermined Subscriber Profile Data may also include psychographic data obtained and selected in a similar manner.

Preferably, the call signal, and the Wireless Mobile Location Data and the Subscriber Identification Code included with the call signal, is transmitted to the Ad Chooser Server 22 of the Call Management System 20 to identify the subscriber as well as the wireless mobile location of the subscriber. The predetermined criteria of the Ad Target Data 25 is then compared to the Wireless Mobile Location Data and to the Subscriber Profile Data 26 to choose the messages to be targeted to the subscriber from the pre-selected messages of the Ad Content Data 24. Accordingly, the messages chosen by the Ad Chooser Server 22 from the Ad Content Data 24 based on the Ad Target Data 25 are further targeted to the subscriber corresponding to the wireless mobile terminal 12 identified by the Subscriber Identification Code on the basis of the predetermined Subscriber Profile Data 26. As such, the subscriber is provided with a message that is targeted to the subscriber on the basis of the predetermined Subscriber Profile Data 26 in addition to the wireless mobile location of the subscriber.

In another alternative embodiment of the system 10 of the invention, the wireless mobile terminal 12 is assigned a unique Subscriber Identification Code, as previously described. The unique Subscriber Identification Code identifies the wireless mobile terminal 12, and thus, identifies the subscriber and the subscriber account corresponding to the wireless mobile terminal. The Historical Response Data 28 relating to the messages previously provided to the subscriber and the responses made by the subscriber to the targeted messages is then determined and recorded from the identity of the subscriber and the subscriber account. The call signal, and the Wireless Mobile Location Data and the Subscriber Identification Code included with the call signal, is transmitted to the Ad Chooser Server 22 of the Call Management System 20 to identify the subscriber as well as the wireless mobile location of the subscriber. The predetermined criteria of the Ad Target Data 25 is then compared to the Wireless Mobile Location Data and to the Historical Response Data 28 to choose the messages to be targeted to the subscriber from the pre-selected messages of the Ad Content Data 24. Accordingly, the messages chosen by the Ad Chooser Server 22 from the Ad Content Data 24 based on the Ad Target Data 25 are further targeted to the subscriber identified by the Subscriber Identification Code on the basis of the messages previously provided to the subscriber and the responses made to the targeted messages. As such, the subscriber is provided with a message that is targeted to the subscriber on the basis of the Historical Response Data 28 in addition to the wireless mobile location of the subscriber.

In yet another alternative embodiment of the system 10 of the invention, the wireless mobile terminal 12 is assigned a unique Subscriber Identification Code, as previously described. The unique Subscriber Identification Code identifies the wireless mobile terminal 12, and thus, identifies the subscriber and the subscriber account corresponding to the wireless mobile terminal. The Historical Response Data 28 relating to the historical movement patterns of the subscriber is then determined and recorded from the identity of the subscriber and the subscriber account. The call signal, and the Wireless Mobile Location Data and the Subscriber Identification Code included with the call signal, is transmitted to the Ad Chooser Server 22 of the Call Management System 20 to identify the subscriber as well as the wireless mobile location of the subscriber. The predetermined criteria of the Ad Target Data 25 is then compared to the Wireless Mobile Location Data and to the Historical Response Data 28 to choose the messages to be targeted to the subscriber from the pre-selected messages of the Ad Content Data 24. Accordingly, the messages chosen by the Ad Chooser Server 22 from the Ad Content Data 24 based on the Ad Target Data 25 are further targeted to the subscriber identified by the Subscriber Identification Code on the basis of the historical movement patterns of the subscriber. As such, the subscriber is provided with a message that is targeted to the subscriber on the basis of the Historical Response Data 28 in addition to the wireless mobile location of the subscriber.

SPECIFIC EXAMPLE OF A SYSTEM AND METHOD ACCORDING TO THE INVENTION

Figure 3:
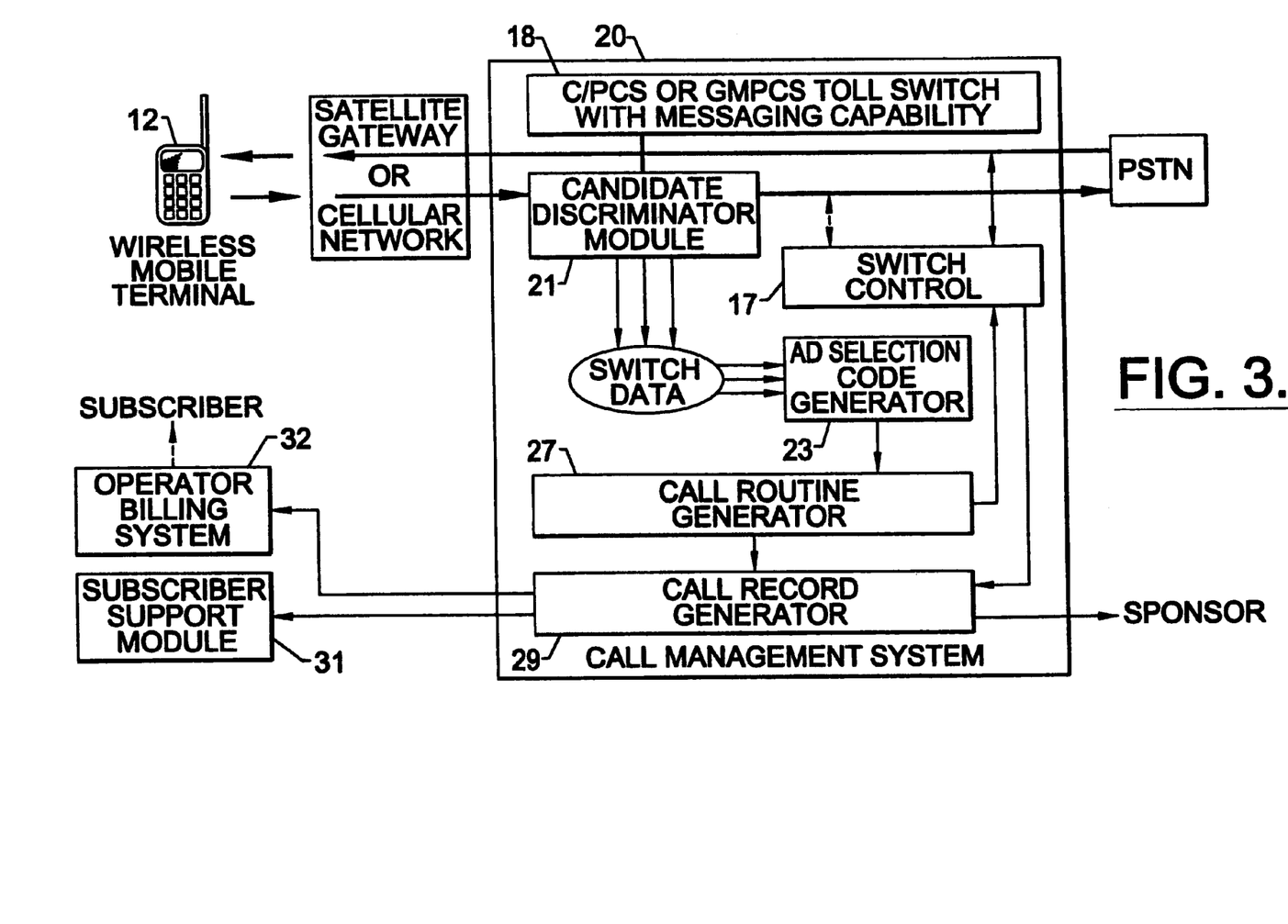
FIG. 3 is a schematic diagram of a specific example of a system for providing targeted advertisements to a subscriber of a C/PCS or GMPCS according to the present invention.
Figure 4:
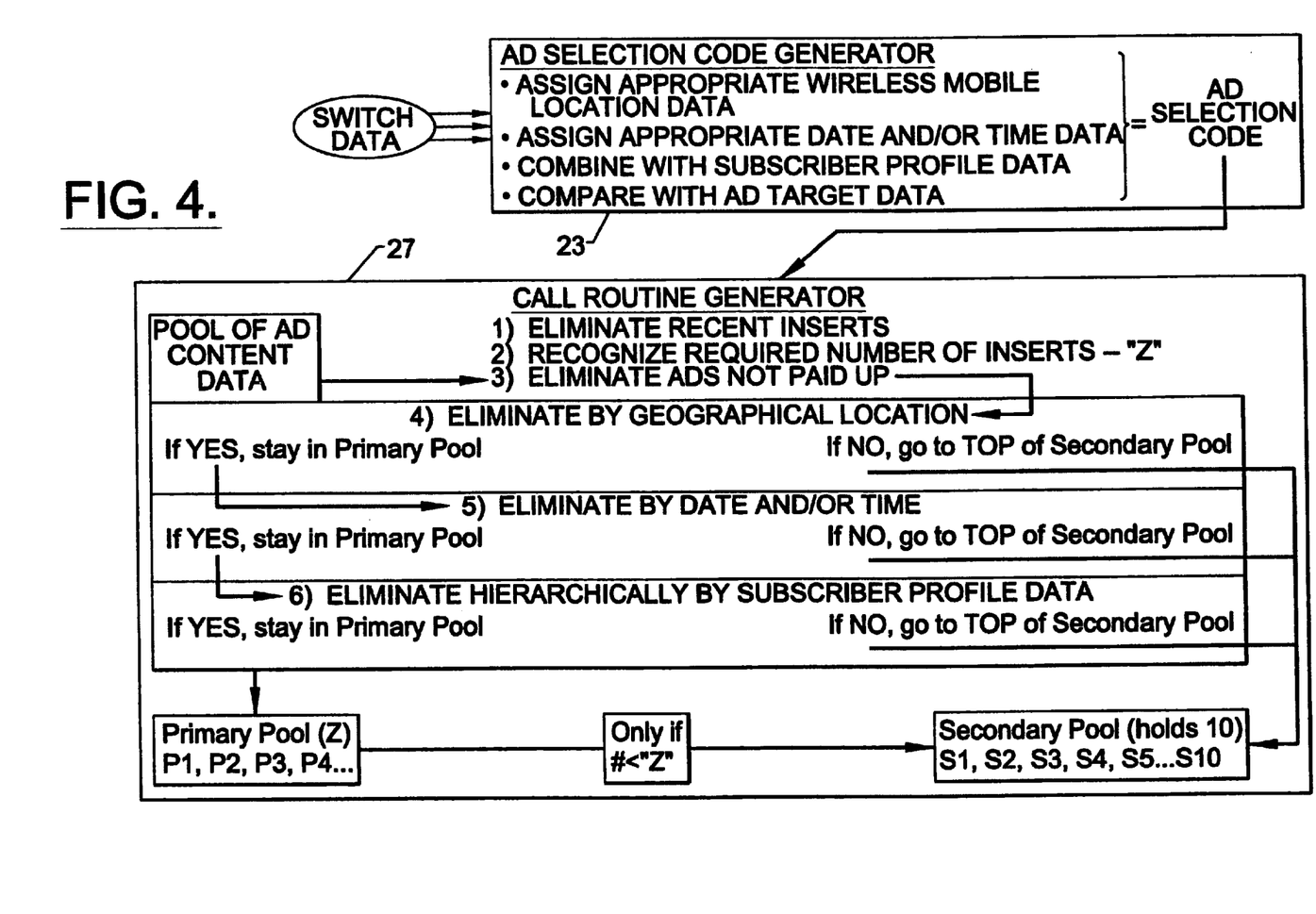
FIG. 4 is a flow chart of a specific example of a method for choosing targeted advertisements according to the invention.

The system and method of the present invention is best illustrated by the specific example shown in FIGS. 3 and 4 wherein the wireless mobile communications service is a conventional C/PCS or GMPCS, and the messages to be targeted to the subscriber of the service consist of audio advertisements. The C/PCS or GMPCS utilizes a telecommunications switch and an information processing system comprising computer software featuring a switch interface program, a database management program and a subscriber billing program.

The telecommunications switch acquires the wireless mobile communication, referred to hereafter as the "call," and routes the call via a Public Switched Telephone Network to the Call Management System 20. As previously discussed, the telecommunications switch may be a Mobile Switching Center 18 in combination with a Voice Response Unit 21 that acts as a switch, a Mobile Switching Center 18 that acts as an intelligent switch or a Mobile Switching Center 18 that utilizes an intelligent network solution. Still further, the telecommunications switch may be a direct RF Feed from a Base Transceiver Station 14 or a Base Station Controller 16 that acts as an intelligent switch or that utilizes an intelligent network solution. As shown in FIG. 3, in the specific example the telecommunications switch is a C/PCS or GMPCS Toll Switch With Messaging Capability 18. Regardless, the Switch 18 provides the switch interface program with the call signal and the telecommunications data, referred to herein as "Switch Data," included with the call signal. Specifically, the Switch Data comprises the Wireless Mobile Location Data to identify the geographical location of the subscriber, the Subscriber Identification Code to identify the subscriber and the subscriber account, the Call Identification Code to identify the particular call and the Date and Time Data to establish the data and time of the call. Once the targeted advertisement has been chosen, as will be described, the switch interface program delivers the targeted advertisement back to the Switch 18 for insertion into the call prior to connection and/or at predetermined intervals during the transmission of the call.

In turn, the switch interface program provides the Switch Data to the database management program. The database management program inputs, outputs, stores and retrieves the Ad Content Data 24 (i.e., the plurality of pre-selected messages to be targeted to the subscriber), the Subscriber Profile Data 26 (i.e., the demographic and personal preference data pertaining to the subscriber) and the Historical Response Data 28 (i.e., the record of the targeted messages previously provided to the subscriber and the responses made to the targeted messages, as well as a record of the geographical location of the subscriber at the time the message was provided to the subscriber). In addition, the database management program inputs, stores and retrieves the Ad Target Data 25 (i.e., the criteria for choosing the messages from the Ad Content Data to be targeted to the subscriber). The database management program combines the Switch Data with the Subscriber Profile Data 26 and the Historical Response Data 28 to generate an Ad Selection Code. The Ad Selection Code is then manipulated to select an appropriate advertisement for the subscriber based on the geographical location of the subscriber, the demographics and preferences of the subscriber, the advertisements previously provided to the subscriber and the date and time of the call.

The subscriber billing program interfaces with the database management program to determine the Subscriber Billing Subsidy 30 to be applied to the subscriber account, to develop subscriber billing records for the Operator Billing System 32, and to invoice the subscriber from the Operator Billing System. In addition, the subscriber billing program provides Ad Insert Records, subscriber data and sponsor data to the operator of the service to conduct billing and customer assistance functions, such as advertisement activation and deactivation, record keeping, reporting and invoicing. Accordingly, the specific example of the invention is a method of inserting targeted advertisements into the wireless mobile communications of certain subscribers of a C/PCS or GMPCS. Thus, the operator of the service can offer subsidized wireless mobile communications to its subscribers while at the same time providing targeted advertising to its advertising customers (i.e., sponsors). In particular, the invention combines telecommunications marketing with the additional capability of targeting the advertisements to subscribers of a C/PCS or GMPCS based on the geographical location of the subscriber at the time that the call is initiated or received.

For example, before a subscriber initiates a C/PCS or GMPCS call by pressing the "send" or "go" key, a series of communications have already occurred between the wireless mobile terminal 12 and the Switch 18. As the call is initiated, the Switch 18 immediately forwards the Wireless Mobile Location Data, the Subscriber Identification Code, the Call Identification Code and the Date and Time Data to the Ad Chooser Server 22 of the Call Management System 20. In the specific example, the Ad Chooser Server 22 comprises a Candidate Discriminator Module 21 and an Ad Selection Code Generator 23. The Candidate Discriminator Module 21 may be embodied in the Switch 18, a separate system or, as shown in FIG. 3, in the Call Management System 20. Regardless, the Candidate Discriminator Module 21 determines which subscribers are to be provided with targeted advertisements. If the Candidate Discriminator Module 21 determines that the Subscriber Identification Code does not identify a subsidized subscriber to the service, the call is routed in a normal manner through the Switch 18. If the Candidate Discriminator Module 21 determines that the Subscriber Identification Code identifies a subsidized subscriber, the Candidate Discriminator Module passes the Switch Data to the information processing system where the Ad Selection Code Generator 23 generates the Ad Selection Code.

The Ad Selection Code Generator 23 generates the Ad Selection Code unless the subscriber presses a predetermined key on the keypad of the wireless mobile terminal 12 or issues a voice command, if voice recognition capability is available, to indicate that a subsidy is not desired for that particular call. If the subscriber elects to not receive or to cancel the advertisement within a predetermined elapsed time, an indication is made in the Ad Insert Records for the subscriber. As a result, the subscriber will be billed at the normal non-subsidized rate for the call and may be charged a small premium by the operator of the service. Alternatively, non-subscribers may be given the opportunity to receive subsidized service by pressing a predetermined key on the keypad to indicate their willingness to receive one or more targeted advertisements. In the latter case, the Candidate Discriminator Module 21 forwards the call to the Ad Selection Code Generator 23. Once the Candidate Discriminator Module 21 determines that the call is to be subsidized with one or more targeted advertisements, a call hold signal is generated and sent to the Switch Control, indicated at 17 in FIG. 3, which prevents the call from being connected by the Switch 18 until insertion of the targeted advertisement(s) is completed. The amount of time allocated for insertion of the targeted advertisement(s) before the call connection process is permitted to begin will depend on the average call connection time. Thus, the operator of the service will be able to utilize the "dead time" before a call is connected for a valuable purpose.

The Ad Selection Code Generator 23 combines the Switch Data with the demographic and personal preference information previously obtained from the subscriber and stored in the Subscriber Profile Data 26 electronic database. The Switch Data and the Subscriber Profile Data 26 specific to the subscriber are combined to generate the Ad Selection Code for the call. The Ad Selection Code embodies a range of elements, including the geographical location of the subscriber at the time of the call (i.e., the wireless mobile location of the wireless mobile terminal 12) and the demographic and personal preference data for the subscriber, as well as the advertisements previously provided to the subscriber, all of which can easily be compared with the sponsor's criteria, or protocols, for targeted advertisements. In addition, the Ad Selection Code may indicate whether the subscriber has agreed to insertion of an advertisement only prior to connection of the call or also at regular intervals during the call. Further, the Ad Selection Code may indicate the subsidy level desired by the subscriber. Accordingly, the length of each advertisement may vary allowing for higher or lower subsidy levels. The Wireless Mobile Location Data and the Date and Time Data components of the Switch Data may also be utilized by the database management program to develop the Historical Response Data 28 for use in targeting future advertisements based on the responses made to the advertisements previously provided to the subscriber and the historical movement patterns of the subscriber. Thus, the Ad Selection Code is not merely a database of unrelated location, identity, demographic, preference, date and time date, but instead is a database of inter-related subscriber information which may be "managed" by a computational algorithm to develop subscriber personality profiles including the previous responses and movement patterns of the subscriber based on wireless mobile location, date and time. Once generated, the Ad Selection Code is forwarded to the Call Routine Generator.

The Call Routine Generator, indicated by 27 in FIG. 3, embodies an algorithm setting out the rules for assigning targeted advertisements to the call in view of the Ad Selection Code and the Ad Target Data 25 established by the sponsors of the advertisements. The algorithm analyzes the preselected advertisements stored in the Ad Content Data 24 electronic database and the predetermined criteria, or protocols, stored in the Ad Target Data 25 electronic database (which define the range of acceptable characteristics of a targeted advertisement) for comparison with the Ad Selection Code. The protocols (i.e., Ad Target Data 25) for each advertisement identify the geographical location of the subscriber, the date and/or time of day, the attributes of the subscriber, the urgency for completing a run on the advertisement, and the level of repetition of the advertisement that is acceptable for the advertisement to be inserted into a call. In addition, the algorithm establishes rules regarding the action to be taken in the event that the Ad Selection Code satisfies the protocols of two or more advertisements or in the event that there the Ad Selection Code does not satisfy the protocols of any of the advertisements. The algorithm of the Call Routine Generator 27 is a multiple step process that begins with a large pool of advertisements and narrows the pool until only advertisements with protocols that are satisfied by the Ad Selection Code remain. The Call Routine Generator 27 may also generate a secondary pool consisting of rejected advertisements whose protocols are nearly but not exactly satisfied by the Ad Selection Code, and from which targeted advertisements may be drawn under specific predetermined circumstances.

The multiple-step process of the algorithm of the Call Routine Generator 27 is illustrated in FIG. 4, and may occur in various sequences, or in parallel, as follows:

First, all advertisements that are not active within the Ad Content Data 24 of the Call Management System 20 are eliminated. Second, the Subscriber Identification Code of the Ad Selection Code is compared to the advertisements available from the Ad Content Data 24 electronic database to eliminate from further consideration those advertisements identified in the Ad Selection Code as being recently inserted into calls made by the same subscriber. Third, the Wireless Mobile Location Data of the Ad Selection Code is compared to the target locations of the Ad Target Data 25 to eliminate from further consideration those advertisements which have a wireless mobile location requirement that is not satisfied by the Ad Selection Code. Fourth, the Date and Time Code of the Ad Selection Code is compared to the target dates and times of the Ad Target Data 25 to eliminate from further consideration advertisements which have a date and/or time requirement that is not satisfied by the Ad Selection Code.

Fifth, the subsidy level for the subscriber is determined so that the Call Routine Generator will obtain the appropriate number of advertisements to be inserted into the call to generate the desired subsidy. Sixth, the Subscriber Profile Data 26 pertaining to the subscriber identified by the Subscriber Identification Code of the Ad Selection Code is compared against the acceptable subscriber profile protocols, such as the demographic, psychographic and personal preference characteristics defined in each of the remaining advertisement. Since the Subscriber Profile Data 26 of the Ad Selection Code will comprise a number of characteristics, each characteristic is compared hierarchically to the protocols of the remaining advertisements in a predetermined order. When an advertisement is eliminated, it is placed into the secondary pool of rejected advertisements which may be called upon if the primary selection pool is not sufficiently large to satisfy subsidy level requirement of the subscriber identified by the Subscriber Identification Code of the Ad Selection Code. The multiple-step process of the algorithm of the Call Routine Generator 27 continues until:

(1) The required number of advertisements remain in the primary pool which meet the geographical location, date and/or time and historical response criteria for the subscriber;

(2) A number of advertisements in excess of the required number remain in the primary pool which meet the geographical location, date and/or time and historical response criteria for the subscriber remain in the primary pool. In this instance, the advertisements with the highest urgency ratings are selected. If a number of advertisements in excess of the required number still remain, then the advertisements with the largest account balance are selected. Finally, if a number of advertisements in excess of the required number still remain, then the required number of advertisements are selected by other predetermined means, such as at random, from the primary pool;

(3) A number of advertisements less than the required number remain in the primary pool. In this instance, the Call Routine Generator 27 of the Call Management System 20 reviews the advertisements in the secondary pool to determine whether any meet predetermined reduced criteria for insertion established by the sponsors of the advertisements; or (4) No advertisement is acceptable for insertion into the call on the basis of either the original or the reduced criteria established by the sponsors of the advertisements. In this instance, the Call Routine Generator 27 of the Call Management System 20 will insert a pre-recorded announcement to the subscriber stating that no sponsored advertisements are available to subsidize the call.

For subscribers who agree to receive one or more advertisements only at the beginning of a call, the Call Routine Generator 27 creates a call routine algorithm providing for a few minutes of subsidy, after which the call is no longer subsidized. For subscribers who agree to accept interruptions during a call, the Call Routine Generator 27 creates a call routine algorithm for managing the call which includes an appropriate number of advertisements, and identifies the intervals upon which the advertisements are to be inserted, such that the entire call may be subsidized. The Call Routine Generator 27 may also be programmed to insert a key element of the Subscriber Profile Data, such as the subscriber's name, age or a particular interest of the subscriber, into the targeted advertisement so as to provide an advertisement that is personal to the subscriber. Once generation of the call routine is complete, the call routine is either:

(1) Forwarded to the Switch 18, along with the targeted advertisements, and the call proceeds;

(2) Forwarded to the Switch 18 without the targeted advertisements, which are held in the Ad Content Data 24 electronic database, and made available upon request of the Switch; or (3) Held in the Call Management System 20, which manages subscriber's calls on a real time basis for the Switch 18 (e.g., if the Switch is not capable of intelligent call management).

Regardless, the Call Management System 20 continues to monitor the call throughout it duration. Monitoring may be necessary for example, so that advertisements are inserted at the appropriate time for calls which include advertisement interruptions (e.g., if the Switch is not capable of intelligent call management), and for reporting purposes.

Subscribers who are charged air time fees for inbound calls likewise may have their inbound calls subsidized. In such cases, the Call Management System 20 will follow the procedure set forth above once an advertisement is selected for inclusion into the call routine, except that after the call has been connected, the subscriber will be warned that an advertisement insertion is pending and will be given an opportunity to cancel the advertisement insertion by pressing a key on the keypad, or by making a voice command if the system is capable of recognizing such a command.

The Call Record Generator, indicated at 29 in FIG. 3, records on a real time or periodic basis information such as: the Subscriber Identification Code, SIM or Smart Card number; the wireless mobile location of the wireless mobile terminal 12 at the origination and/or termination of the call; the date and/or time at the origination and/or termination of the call; each targeted advertisement inserted into the call; an indication whether the targeted advertisement was inserted before call connection or during the call; the sponsor of the targeted advertisement, and thus, the subsidy; whether a response, a request for further information, or a request for connection to a telemarketing representative was made; and the length of the call. The length of the call information will allow the Call Management System 20 to determine whether the targeted advertisement was inserted fully, or whether the call terminated during the targeted advertisement. Other information specifically requested by the operator of the service or the sponsor of the advertisement may also be provided.

Once the Call Record Generator 29 gathers the desired information, referred to herein as Ad Insert Records, it is forwarded to the Operator Billing System 32. The Operator Billing System 32 utilizes the Ad Insert Records to compute the appropriate subsidy, referred to herein as the Subscriber Billing Subsidy 30 to be credited against the subscriber's account. The Subscriber Billing System 32 then applies the Subscriber Billing Subsidy 30 to the subscriber's account and invoices the subscriber or applies the credit to the subscriber's future air time. Alternately, for subscribers paying a predetermined monthly charge, which includes a certain number of minutes without charge, the monthly charge is reduced appropriately. The operator of the service then bills the subscriber the appropriate amount including any subsidy earned by the subscriber.

The Call Record Generator 29 also forwards the Ad Insert Records data to the Subscriber Support Module, indicated at 31 in FIG. 3. The Subscriber Support Module 31 processes inquiries, responses and requests from the subscriber. Immediately following completion of a targeted advertisement, a group of targeted advertisements or a call which included a targeted advertisement of particular interest to the subscriber, the Subscriber Support Module 31 can insert a related advertisement to provide additional information to the subscriber. The inquiry, response or request from the subscriber may be received and answered by a subscriber support representative or may be transmitted to the Subscriber Support Module 31 for processing by a keypad or voice command from the subscriber. The information provided to the subscriber may vary based on the geographical location of the subscriber at the time that the inquiry, response or request is made. Alternately, customer inquiries, responses and requests from the subscriber may be addressed externally by a subscriber support representative using information provided to the representative by the Subscriber Support Module 31. The Subscriber Support Module 31 may also be programmed to forward the call to an external destination, such as a telemarketing representative. Additional information or forwarded calls may occur during the call immediately upon request, immediately after the call is completed or by a programmed call back. In addition, the Subscriber Support Module 31 may have the ability to provide information relating to the targeted advertisements previously provided to the subscriber. For example, when called by a subscriber, the Subscriber Support Module 31 may have the ability to provide the subscriber with information about a predetermined number of the most recent targeted advertisements inserted into a call, when each advertisement was inserted, the geographical location of the subscriber at the time the advertisement was inserted, the amount of the subsidy earned by the subscriber for the targeted advertisement, a contact number for the sponsor of the advertisement and any additional which the subscriber support representative can provide to the subscriber.

The Call Record Generator 29 may also be programmed to generate various reports for use b the operator of the service for subscriber billing and for progress and effectiveness review by the operator of the service or the sponsor of the advertisement. The Call Record Reports may list information such as the amount of subsidy earned by the subscriber, the geographical location for which an advertisement was inserted, the date and time at the location for which the advertisement was inserted, the order in which the advertisement was inserted in the call, an indication of whether the advertisement was fully inserted or partially inserted, the entire Subscriber Profile Data of the subscriber for whom the advertisement was inserted (possibly including address, name and home telephone number), whether the advertisement was a perfect match or involved a lower hierarchy match, the charge credit against the subscriber's account and the balance of the subscriber's account on the report date.

The actual process of inserting targeted advertisements into a call may differ somewhat for each C/PCS and GMPCS based on specific architecture and integration requirements. For GMPCS, the information processing system may actually integrate with the network at the land earth station or gateway, which may or may not include the GMPCS Mobile Toll Switch. Alternately, the system could process the call information and link the appropriate call routine at the central network control or operations center where the satellite call is recognized and routed to the land earth station. Accordingly, it is to be understood that the foregoing description of the preferred embodiments and the specific example provided herein are merely illustrative of the best mode of the invention and the principles thereof and that various modifications and additions may be made to the system and method by those skilled in the art, without departing from the spirit and scope of this invention, which is therefore understood to be limited only by the scope of the appended claims.

That which is claimed is:

1. A wireless mobile telephony system for providing a message to a subscriber of a wireless mobile communications service that is targeted to the subscriber on the basis of wireless mobile location and subscriber profile, said system comprising:

a wireless mobile terminal for initiating and receiving a wireless mobile communication comprising a call signal and wireless mobile location data included with said call signal, said terminal comprising a first transceiver for transmitting and receiving said call signal and said wireless mobile location data;

a base transceiver station in communication with said wireless mobile terminal, said base transceiver station comprising a second transceiver for transmitting and receiving said call signal and said wireless mobile location data;

a call management system in communication with said base transceiver station, said call management system comprising an ad chooser for choosing the message to be targeted to the mobile terminal identified by said call signal;

a first electronic data input, storage and retrieval device in electrical communication with said ad chooser, said first electronic data input, storage and retrieval device comprising a module that stores and selectively retrieves ad content data and ad target data, said ad content data comprising a plurality of messages and said ad target data comprising predetermined criteria for choosing the message to be provided to the subscriber from said plurality of messages of said ad content data; and a second electronic data input, storage and retrieval device in electrical communication with said ad chooser, said second electronic data input, storage and retrieval device comprising a module that stores and selectively retrieves predetermined subscriber profile data;

wherein said ad chooser chooses the message to be provided to the subscriber on the basis of comparison of said ad target data with said subscriber profile data, said mobile terminal identification, and said wireless mobile location data.

2. A wireless mobile telephony system according to claim 1 wherein said wireless mobile terminal is assigned a unique subscriber identification code for identifying the subscriber;

said call management system further comprises a third electronic data input, storage and retrieval device in electrical communication with said ad chooser of said call management system, said third electronic data input, storage and retrieval device comprising a module that stores and selectively retrieves historical response data relating to the responses made to the previous messages provided to the subscriber identified by the unique subscriber identification code; and wherein said ad chooser further chooses the message to be provided to the subscriber on the basis of said historical response data.

3. A wireless mobile telephony system according to claim 1 wherein said wireless mobile terminal is assigned a unique subscriber identification code for identifying the subscriber; said call management system further comprises a third electronic data input, storage and retrieval device in electrical communication with said ad chooser of said call management system, said third electronic data input, storage and retrieval device comprising a module that stores and selectively retrieves historical response data relating to the historical movement patterns of the subscriber identified by the unique subscriber identification code; and wherein said ad chooser further chooses the message to be provided to the subscriber on the basis of said historical response data.

4. A wireless mobile telephony system according to claim 1 wherein said call management system further comprises a voice response unit in electrical communication with said ad chooser, said voice response unit comprising a plurality of ports and voice cards, said ports for receiving the wireless mobile communication, parking the wireless mobile communication and redirecting the wireless mobile communication to its final destination said voice cards for inserting the message targeted to the subscriber of the wireless mobile communications service into the wireless mobile communication.

5. A wireless mobile telephony system according to claim 1 wherein said call signal further comprises a call identification code and date and time data; and wherein said ad chooser further chooses the message to be provided to the subscriber on the basis of said date and time data.

6. A wireless mobile telephony system according to claim 1 wherein said predetermined subscriber profile data is selected from the group consisting of demographic and personal preference data pertaining to the subscriber of the wireless mobile communications service.

7. A method of providing a message to a subscriber of a wireless mobile communications service that is targeted to the subscriber on the basis of a combination of wireless mobile location and subscriber profile data, said method comprising the steps of:

(a) compiling a first electronic database comprising a plurality of messages and criteria for choosing the message to be provided to the subscriber from the plurality of messages;

(b) providing a wireless mobile terminal comprising a first transceiver for initiating and receiving a wireless mobile communication comprising a call signal and wireless mobile location data included with the call signal;

(c) extracting the wireless mobile location data from the wireless mobile communication initiated or received by the wireless mobile terminal;

(d) assigning a unique subscriber identification code to the wireless mobile terminal for identifying wireless mobile terminal associated with the subscriber;

(e) compiling a second database comprising subscriber profile data pertaining to the subscriber identified by the subscriber identification code;

(f) associating the subscriber profile data with the identified wireless mobile terminal;

(g) compiling a historic response database including past responses of the subscriber and past location movement patterns of the subscriber;

(h) providing the wireless mobile location data, the historic response data, and the subscriber profile data to a call management system comprising an ad chooser for choosing the message to be provided to the subscriber; and (i) utilizing the ad chooser to compare the criteria of the first electronic database with the wireless mobile location data, the historic response data, and the subscriber profile data to choose a message from the plurality of messages to be targeted to the subscriber.

8. A method according to claim 7 comprising the further steps of:

(h) compiling a third electronic database comprising historical response data relating to the responses made to the previous messages provided to the subscriber identified by the unique subscriber identification code;

(i) utilizing the ad chooser to further compare the criteria of the first electronic database with the historical response data to choose a message from the plurality of messages to be targeted to the subscriber.

9. A method according to claim 7 comprising the further steps of:

(h) compiling a third database, comprising historical response data relating to the historical movement patterns of the subscriber identified by the unique subscriber identification code;

(i) utilizing the ad chooser to further compare the criteria of the first database with the historical response data to choose a message from the plurality of messages to be targeted to the subscriber.

10. A method according to claim 7 comprising the further steps of:

(h) querying the subscriber of the wireless mobile communication to respond to the targeted message provided to the subscriber with a request;

(i) monitoring the request made by the subscriber in response to the query; and (j) fulfilling the request made by the subscriber;

wherein the request is selected from the group consisting of: inserting a second targeted message into the wireless mobile communication, providing a written record of the targeted message to the subscriber and providing a direct communication link with a representative of the wireless communication service or the sponsor of the message to the subscriber.

11. A method according to claim 7 wherein the subscriber profile data is selected from the group consisting of: demographic and personal preference data pertaining to the subscriber of the wireless mobile communications service.

12. A method according to claim 7 comprising the further steps of:

(h) providing a base transceiver station in communication with the wireless mobile terminal, said base transceiver station comprising a second transceiver for transmitting and receiving the wireless mobile communication;

(i) providing a base station controller in electrical communication with the base transceiver station, and (j) providing a mobile switching center in electrical communication with the base station controller, a local landline network and a voice response unit of the call management system that acquires and routes the wireless communication, said voice response unit comprising a plurality of ports and voice cards, said ports for receiving the wireless mobile communication, parking the wireless mobile communication and redirecting the wireless mobile communication to its final destination, said voice cards for inserting the message targeted to the subscriber of the wireless mobile communications service into the wireless mobile communication.

13. A method according to claim 12 wherein the voice response unit of the call management system is in electrical communication with the mobile switching center and the ad chooser server of the call management system.

14. A method of providing promotional messages to a user of a mobile terminal of a mobile communication system, the method comprising the steps of:

identifying the mobile terminal utilized by said user;

accessing historical response data based on identification of said mobile terminal utilized by said user;

selecting a promotional message based on said identification of the mobile terminal and historical response data; and transmitting at least one promotional message to said mobile terminal;

wherein said historic response data is acquired and updated as said mobile terminal is utilized by said user in response to said at least one promotional message.

15. The method of claim 14, wherein the step of identifying the mobile terminal of said user comprises extracting call identification code data from a call signal.

16. The method of claim 14, further including the steps of:

receiving a request from the user for another promotional message; and in response to the request, transmitting another promotional message to the user.

17. The method of claim 14, wherein the user communicates with a remote party via the mobile terminal; and the step of transmitting at least one promotional message to the user occurs before the user communicates with the remote party.

18. The method of claim 14, wherein the user communicates with a remote party via the mobile terminal; and the step of transmitting at least one promotional message to the user occurs after the user communicates with the remote party.

19. The method of claim 14, wherein the user communicates with a remote party via the mobile terminal; and the step of transmitting at least one promotional message to the user occurs during a time period in which the user communicates with the remote party.

20. The method of claim 14, wherein said historical response data consists of responses made to targeted messages previously provided to said user.

21. A method of providing promotional messages to the user of a mobile terminal of a mobile communication system, the method comprising the steps of:

identifying the location of a user with a geo-position system;

identifying the mobile terminal utilized by the user;

identifying ad target data associated with the identified mobile terminal;

selecting a promotional message based on the location, ad target data, and identity of the mobile terminal; and transmitting at least one promotional message to the user.

22. The method of claim 21, wherein the mobile terminal includes the global positioning system device.

23. The method of claim 21, further including the steps of:

receiving a request from the user for another promotional message; and in response to the request, transmitting another promotional message to the user.

24. The method of claim 21, wherein the user communicates with a remote party via the mobile terminal; and the step of transmitting at least one promotional message to the user occurs before the user communicates with the remote party.

25. The method of claim 21, wherein the user communicates with a remote party via the mobile terminal; and the step of transmitting at least one promotional message to the user occurs after the user communicates with the remote party.

26. The method of claim 21, wherein the user communicates with a remote party via the mobile terminal; and the step of transmitting at least one promotional message to the user occurs during a time period in which the user communicates with the remote party.

27. A method of providing promotional messages to the user of a mobile terminal of a mobile communication system, the method comprising the steps of:

identifying the location of a user with a geo-position system;

identifying the mobile terminal utilized by the user;

accessing subscriber profile data based on identification of the mobile terminal utilized by the user;

accessing ad target data based on identification of the mobile terminal utilized by the user;

selecting a promotional message based on the location, ad target data, and subscriber profile data of the user; and transmitting at least one promotional message to the user.

28. The method of claim 27, wherein the mobile terminal includes a global positioning system device.

29. The method of claim 27, further including the steps of:

receiving a request from the user for another promotional message; and in response to the request, transmitting another promotional message to the user.

30. The method of claim 27, wherein the user communicates with a remote party via the mobile terminal; and the step of transmitting at least one promotional message to the user occurs before the user communicates with the remote party.

31. The method of claim 27, wherein the user communicates with a remote party via the mobile terminal; and the step of transmitting at least one promotional message to the user occurs after the user communicates with the remote party.

32. The method of claim 27, wherein the user communicates with a remote party via the mobile terminal; and the step of transmitting at least one promotional message to the user occurs during a time period in which the user communicates with the remote party.

33. A method of providing promotional messages to a user of a mobile terminal within a GMPCS satellite communications service, the method comprising the steps of:

identifying the mobile terminal location using geo-positioning;

determining an identity of said mobile terminal using a subscriber identification code;

selecting at least one promotional message based on said identity of the mobile terminal location, said geo-position location of said mobile terminal, and at least one historic response of said user; and transmitting the at least one promotional message to said mobile terminal.

34. The method of claim 33, wherein said geo-positioning utilizes one or more of a global positioning system communications relay satellite whereby satellite-based location determination system is more precise than in a ground-based, cell-oriented location determination system.

35. The method of claim 33, wherein said subscriber identification code is unique and pre-programmed into said wireless mobile terminal whereby discrimination between multiple wireless terminals is provided.

36. The method of claim 33, further comprising the steps of:

receiving a request from said user of said mobile terminal for another promotional message; and in response to said request, transmitting another promotional message to said mobile terminal.

* * * * *